(12) United States Patent
Nozawa

(10) Patent No.: US 7,756,203 B2
(45) Date of Patent: Jul. 13, 2010

(54) IMAGE PROCESSING APPARATUS

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1451 days.

(21) Appl. No.: 11/134,288

(22) Filed: May 23, 2005

(65) Prior Publication Data

US 2005/0265448 A1 Dec. 1, 2005

(30) Foreign Application Priority Data

Jun. 1, 2004 (JP) ............................. 2004-163559

(51) Int. Cl.
  H04N 7/12 (2006.01)
  H04N 11/02 (2006.01)
  H04N 11/04 (2006.01)
  H04B 1/66 (2006.01)
(52) U.S. Cl. ................................. 375/240.12
(58) Field of Classification Search ........................ None
See application file for complete search history.

(56) References Cited

U.S. PATENT DOCUMENTS

| | | | |
|---|---|---|---|
| 5,461,420 A | 10/1995 | Yonemitsu et al. | 348/401 |
| 5,691,771 A * | 11/1997 | Oishi et al. | 348/97 |
| 5,768,469 A | 6/1998 | Yagasaki et al. | 386/109 |
| 5,835,672 A * | 11/1998 | Yagasaki et al. | 386/111 |
| 6,529,550 B2 * | 3/2003 | Tahara et al. | 375/240 |
| 6,671,323 B1 * | 12/2003 | Tahara et al. | 375/240.26 |
| 6,934,335 B2 * | 8/2005 | Liu et al. | 375/240.16 |
| 7,142,245 B2 | 11/2006 | Kono et al. | 348/441 |
| 2004/0136686 A1 | 7/2004 | Kono et al. | 386/46 |

FOREIGN PATENT DOCUMENTS

| | | |
|---|---|---|
| CN | 1221288 | 6/1999 |
| CN | 1499836 | 5/2004 |
| JP | 2000-41244 | 2/2000 |
| JP | 2003-324737 | * 11/2003 |
| JP | 2004-104356 | * 4/2004 |

* cited by examiner

*Primary Examiner*—Nhon T Diep
(74) *Attorney, Agent, or Firm*—Fitzpatrick, Cella, Harper & Scinto

(57) ABSTRACT

A signal processing apparatus includes a conversion unit, an encoding unit, and a control unit. The conversion unit converts first moving image data having a first frame rate into second moving image data having a second frame rate by inserting a new frame into the first moving image data having the first frame rate at predetermined timing. The encoding unit encodes the second moving image data having the second frame rate by selectively using intra-frame encoding and inter-frame prediction encoding. The encoding unit classifies each frame of the second moving image data as a first frame type which is not referred to in the inter-frame prediction encoding and a second frame type which is referred to in the inter-frame prediction encoding, and the encoding unit encodes the second moving image data according to the classification result. The control unit controls the encoding unit such that the frame inserted by the conversion unit among the second moving image data is encoded by classifying the inserted frame as a particular frame type.

10 Claims, 4 Drawing Sheets

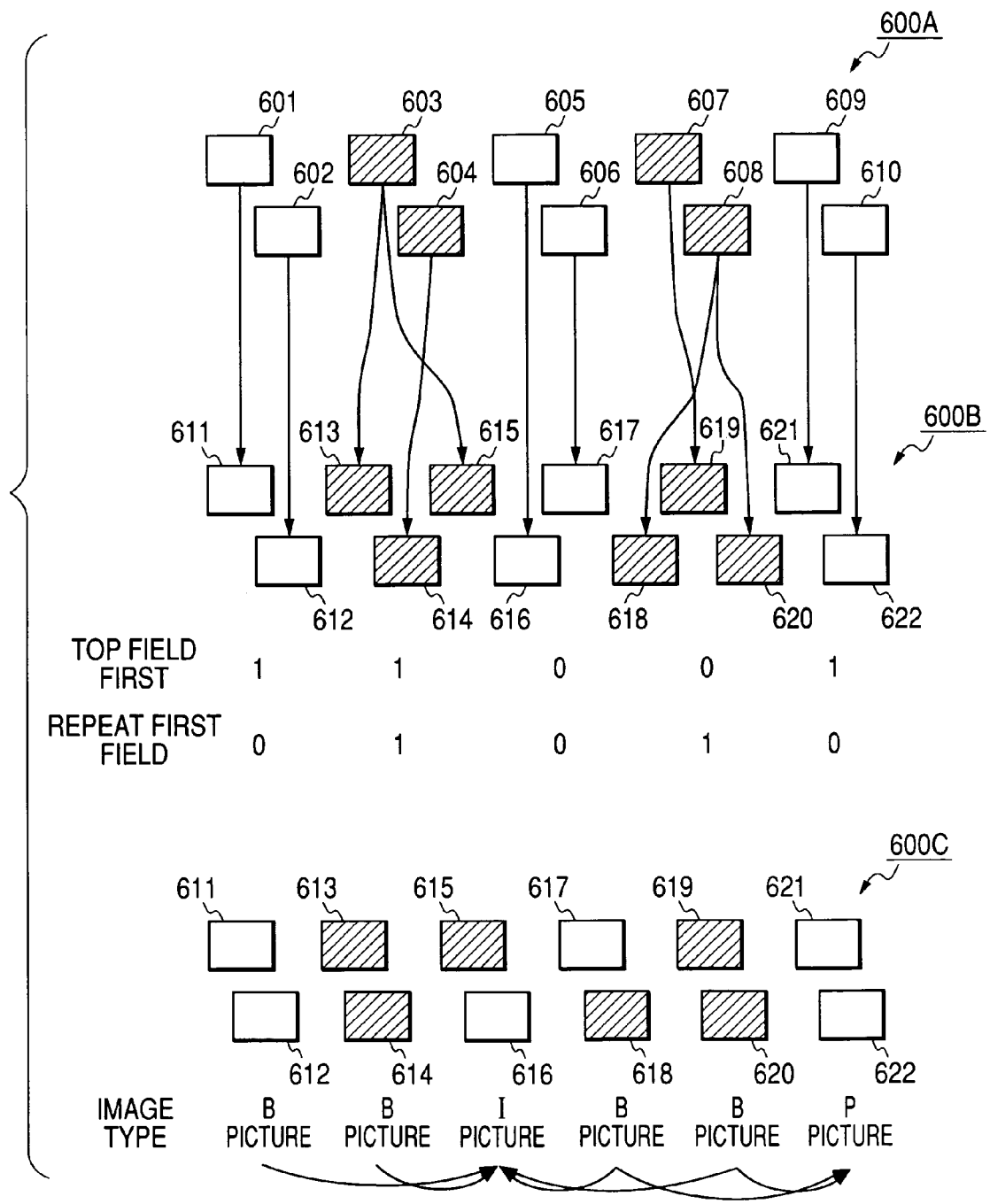

IMAGE PROCESSING APPARATUS

BACKGROUND OF THE INVENTION

1. Field of the Invention

The present invention relates to a signal processing apparatus and method, and particularly relates to the signal processing apparatus and method which are preferably used to process moving image stream data in which compression encoding is performed.

2. Related Background Art

Recently, with progress of digital signal processing technology, a large amount of digital information such as a moving image, a still image, and sound can be encoded at high efficiency to record the encoded information in a small magnetic medium or a small optical medium or to transmit the encoded information through a communication medium. Further, such technology is applied to development of an image pickup apparatus which can easily take a high-quality video image to immediately output the video image to an information medium.

Particularly, an MPEG encoding technology is used in the recent moving image encoding. In the MPEG encoding, an encoding rate can be largely decreased by an intra-frame encoding method in which the encoding is performed by a correlation within a picture and an inter-frame encoding method in which the encoding is performed by the correlation between the preceding picture and the succeeding picture. Therefore, the MPEG encoding is widely used in a video image reproducing apparatus represented by a DVD video player and the image pickup apparatus such as a video camera.

In a television standard in Japan and the United State, a frame rate of a video signal is defined as about 30 frames per second.

On the other hand, the frame rate of the video image of the film material used in a movie usually has about 24 frames per second.

Therefore, in order to treat the video image having 24 frames per second of the film material by a video apparatus having a video standard, there is a well-known technology in which the MPEG encoding is performed by converting the video image having 24 frames per second into the signal having about 30 frames per second (for example, see Japanese Patent Application Laid-Open No. 2000-41244).

A method called 2-3 pull-down is well known as the technology in which the video image having 24 frames per second is converted into the signal having about 30 frames per second. The technology is frequently used when the film material such as the movie is converted into the video image for the television.

FIG. 6 is a view for explaining a 2-3 pull-down process.

In FIG. 6, the reference numerals 601 to 610 denote a state of each field of a video image having about 24 frames per second, and the fields 601 to 610 constitute a field string 600A. One frame in the field string 600A includes two fields having an interlace format. The reference numeral 600B denotes a field string having about 30 frames per second into which the field string 600A having about 24 frames per second is converted.

That is, the conversion is performed by repeatedly converting each two fields of the input video images into two fields of the output video images or three fields of the output images such that fields 601 and 602 of the field string 600A are converted into fields 611 and 612 of the field string 600B and fields 603 and 604 of the field string 600A are converted into fields 613, 614, and 615 of the field string 600B. Five fields of the output video images are generated in each four fields of the input video images by the repetition, which realizes the conversion of 24 frames per second into 30 frames per second.

At this point, in converting the two fields into the three fields, the first field and the third field have the same data. For example, the fields 613 and 615 are generated based on the field 603. Similarly the fields 618 and 620 have the same data.

When the video signal in which the frame rate has been converted is recorded by the MPEG coding, sometimes parameters referred to as "top field first" and "repeat first field" are used in order to remove redundancy of the 2-3 pull-down video image.

When the parameter of the repeat first field is "0", the two-field configuration is indicated. When the parameter of the repeat first field is "1", the three-field configuration is indicated. As described above, in the case of the three-field configuration, since the first field is similar to the third field, encoding data is not generated actually for the third field during the MPEG encoding, instead decoding data of the first field is directly output during decoding.

On the other hand, the parameter of the top field first indicates whether a top field or a bottom field is first in the temporal order in the original video signal having 24 frames per second. In the case of the top field first is "0", the top field first indicates that the bottom field is first. In the case of the top field first is "1", the top field first indicates that the top field is first.

In such a conventional apparatus, there is a problem that the use of combination of the parameters increases complication of the stream to impose a load on the decoding process. That is, in order to normally decode the generated stream, it is necessary that the parameters are identified and a copy field is inserted on the decoding process side. Therefore, sometimes the normal reproduction cannot be performed in a decoding apparatus or system in which MPEG is partially loaded.

In the simpler conventional method, there is the method of directly encoding the 2-3 pull-down video image. This method has an advantage that no load is generated in the decoding process, because the video image having 30 frames per second after the pull-down is directly encoded as the stream.

However, as described above, when the recording is performed by the MPEG encoding of the video signal having 30 frames per second after the 2-3 pull-down, in the reproduction, it is difficult to re-convert the video signal having 30 frames per second into the video signal having 24 frames per second which has no redundancy before the pull-down.

Because, when the inserted frame is referred to from other frames by the encoding with the inter-image correlation which is unique to MPEG, the data of the frame referring to the inserted frame cannot be decoded when the inserted frame is directly removed, so that the inserted frame cannot be removed.

Accordingly, in order to obtain the video signal having 24 frames per second in the MPEG encoded form from the video signal in which the MPEG encoding is performed after the 2-3 pull-down, it is necessary that the video signal is decoded once while having 30 frames per second, and the encoding is performed again by removing the frame inserted after the decoding. Therefore, there are problems that it takes a very long time to perform the process and image quality is degraded by the re-encoding.

SUMMARY OF THE INVENTION

An object of the invention is to solve the above problems.

Another object of the invention is provide an apparatus which can easily convert the encoded moving image data into the encoded moving image data having the different frame rate.

In order to achieve the above objects, according to one aspect of the present invention, a signal processing apparatus of the invention comprises: conversion means for converting first moving image data having a first frame rate into second moving image data having a second frame rate by inserting a new frame into the first moving image data having the first frame rate at predetermined timing; encoding means for encoding the second moving image data having the second frame rate by selectively using intra-frame encoding and inter-frame prediction encoding, the encoding means classifying each frame of the second moving image data as a first frame type which is not referred to in the inter-frame prediction encoding and a second frame type which is referred to in the inter-frame prediction encoding, and encoding the second moving image data according to the classification result; and control means for controlling the encoding means so that the frame inserted by the conversion means among the of second moving image data is encoded by classifying the inserted frame as a particular frame type.

Other objects and advantages of the invention will become more apparent from the following detail description of the preferred embodiments of the invention in conjunction with the drawings.

BRIEF DESCRIPTION OF THE DRAWINGS

FIG. 6 shows a frame configuration and a structure of an MPEG stream in a 2-3 pull-down process.

DESCRIPTION OF THE EMBODIMENTS

Referring to the accompanying drawings, preferred embodiments according to the signal processing apparatus and signal processing method of the invention will be described in detail.

First Embodiment

Figure 1:
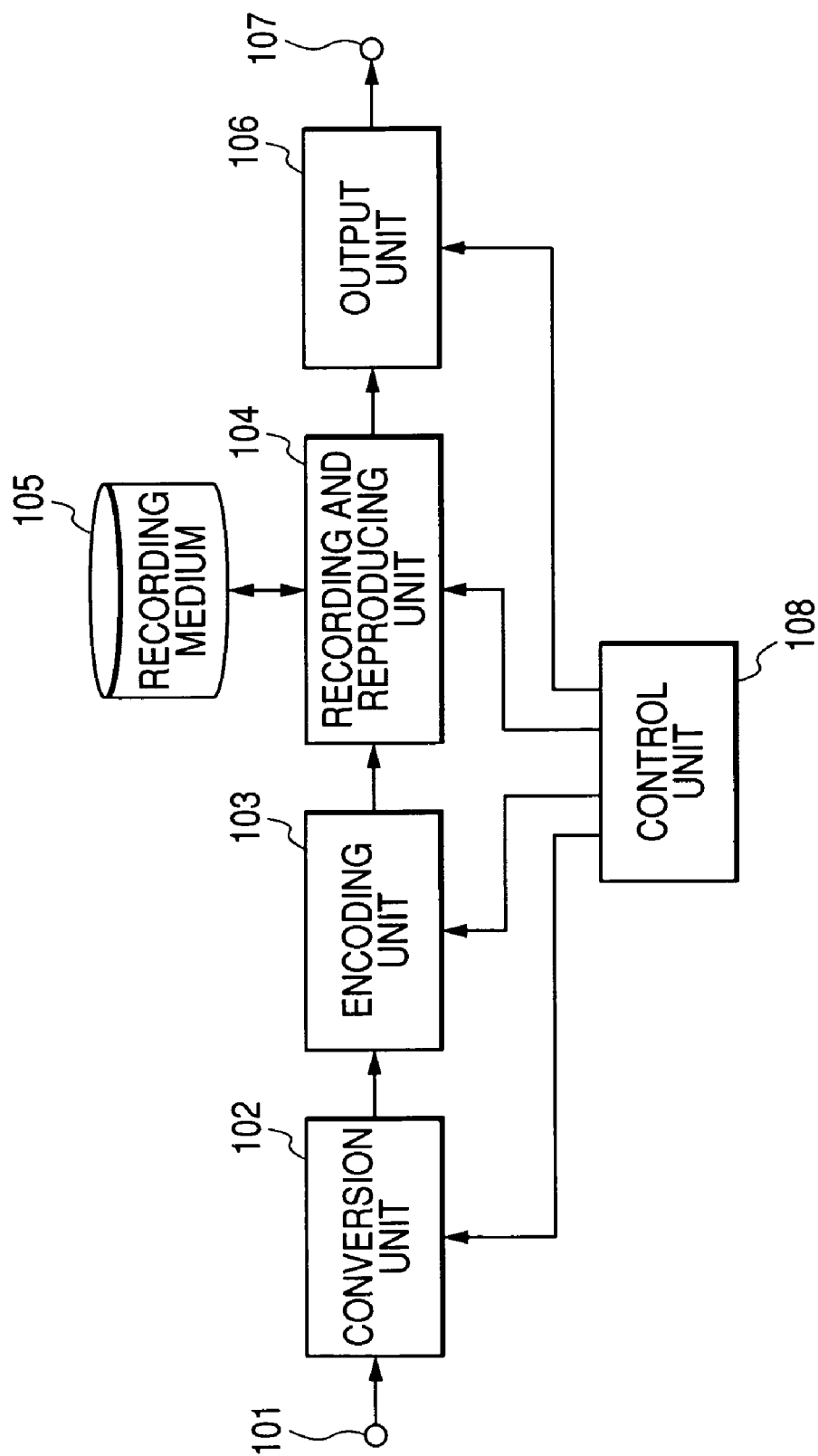
FIG. 1 is a block diagram showing a configuration of an image processing apparatus according to an embodiment of the invention.

FIG. 1 shows a block diagram of a configuration of the image processing apparatus in a first embodiment. In FIG. 1, the reference numeral 101 denotes a video signal input terminal, the reference numeral 102 denotes a conversion unit, the reference numeral 103 denotes an encoding unit, the reference numeral 104 denotes a recording and reproducing unit which gets access to a recording medium 105 in order to read and write data, the reference numeral 105 denotes the writable recording medium such as a disk and a magnetic tape, the reference numeral 106 denotes an output unit which outputs a stream to an output terminal 107, the reference numeral 107 denotes the output terminal such as IEEE1394 and USB, and the reference numeral 108 denotes a control unit which controls each block.

The video signal having a frame rate of 24 frames per second is input from the video signal input terminal 101, and is supplied to the conversion unit 102. The conversion unit 102 inserts one frame in each four frames to form the video signal having the five frames, which allows the video signal having the five frames to be converted into the video signal having 30 frames per second.

Figure 2:
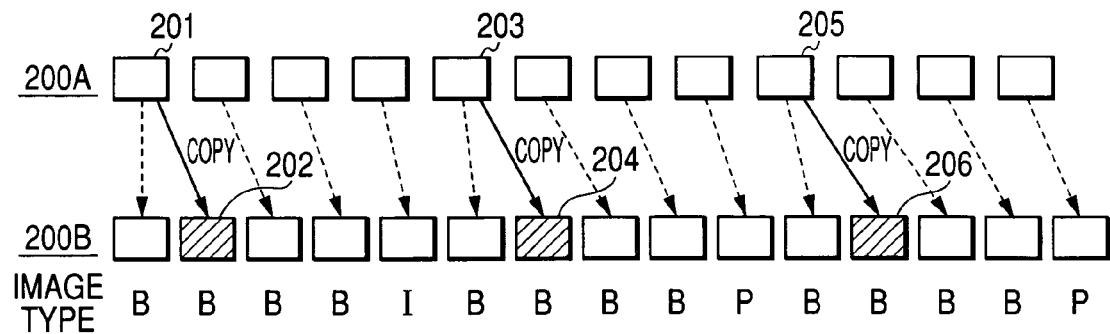
FIG. 2 is a view for explaining a process performed by a conversion unit in a first embodiment.

FIG. 2 shows an example of a conversion process performed by the conversion unit 102. In FIG. 2, the reference numeral 200A denotes input moving image data having 24 frames per second, and the reference numeral 200B denotes moving image data in which the moving image data having 24 frames per second is converted into the moving image data having 30 frames per second.

As shown in FIG. 2, a frame 202 which is the same data as for a frame 201 is inserted after the frame 201, a frame 204 which is the same data as for a frame 203 is inserted after the frame 203, and a frame 206 which is the same data as for a frame 205 is inserted after the frame 205. Hereinafter the frame inserted in a frame rate conversion process is referred to as copy frame.

The four-frame video signal is converted into the five-frame video signal by inserting the frame having the same data for every four frames in the input video signal having the 24 frames. The control unit 108 gives a direction of timing in which the same frame is inserted.

The video signal input terminal 101 is required only to input the video image having 24 frames per second. For example, the image pickup apparatus which takes the video image at the rate of 24 frames per second or a film scanner which sequentially reads film of a movie material having 24 frames per second may be used as the video signal input terminal 101. When source of the data exists on a network, it is also possible that the video signal input terminal 101 is regarded as a network interface.

The video signal subjected to the rate conversion is supplied from the conversion unit 102 to the encoding unit 103. The encoding unit 103 encodes the video signal by an MPEG encoding process to generate a stream in which the amount of information of the encoded video signal is compressed, and then the encoding unit 103 supplies the stream to the recording and reproducing unit 104.

At this point, the encoding unit 103 performs the compression based on parameters supplied from the control unit 108. For example, the encoding unit 103 receives the parameters such as an image type for specifying encoding method in each image. The image type includes an I picture in which the encoding is performed only by using the data in the same frame, a P picture in which differential data between the frame and the preceding frame is encoded, and a B picture in which the differential data between the frame and each of preceding frame and the succeeding frame is encoded.

Both the I picture and the P picture become a reference frame for other P pictures and the B picture, while the B picture does not become the reference frame for other frames.

The control unit 108 directs a copy frame generated by the conversion unit 102, or the like the frames 202, 204, and 206 in FIG. 2 to be encoded as the B picture.

Thus, the frames 202, 204, and 206 which are of the copy frame are formed in the image type which does not become the reference frame for other frames, which allows the removed MPEG stream to be correctly decoded even if the copy frames 202, 204, and 206 are removed from the MPEG stream.

The stream generated by the encoding unit 103 is stored in the recording medium 105 through the recording and reproducing unit 104. The recorded stream is read through the recording and reproducing unit 104, and the stream is supplied to the output unit 106. According to the direction from the control unit 108, the output unit 106 converts the stream having 30 frames per second into the stream having 24 frames per second to output the stream having 24 frames per second to the output terminal 107.

When the output unit 106 receives the direction of 24-frame output from the control unit 108, the output unit 106 removes the data corresponding to the copy frames 202, 204, and 206 from the MPEG stream having 30 frames per second, which is supplied from the recording and reproducing unit 104, and the output unit 106 converts the stream having 30 frames per second into the stream having 24 frames per second by updating the parameters such as a time stamp so that the parameters are compatible with the stream having 24 frames per second.

At this point, because insertion timing of the copy frame is previously determined, it is possible that the timing of the removed frame is determined by computation of the control unit 108, or it is possible that the encoding unit 103 previously embeds flag information in the corresponding image and the control unit 108 recognizes the flag information.

When the control unit 108 gives the direction of 30-frame output, the output unit 106 directly outputs the MPEG stream having 30 frames per second to the output terminal without performing the frame removing process.

Figure 5:
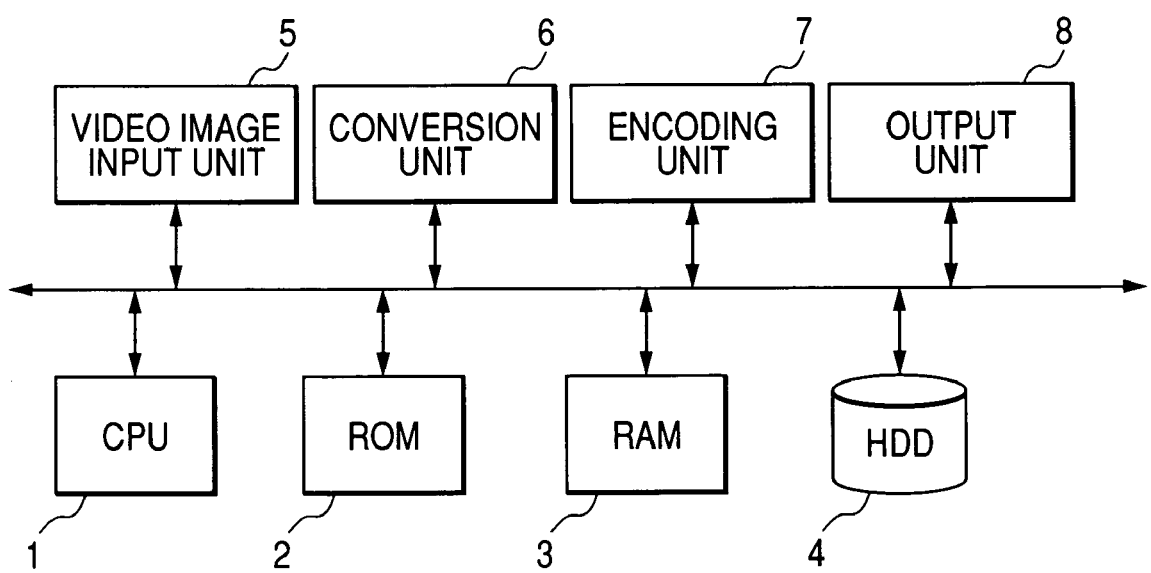
FIG. 5 shows an apparatus configuration when the process is performed through software.

FIG. 5 shows a configuration when the image processing in the first embodiment is performed on a general purpose information processing apparatus such as a personal computer.

In FIG. 5, the reference numeral 1 denotes a CPU which controls the whole of the apparatus, the reference numeral 2 denotes a ROM in which a BIOS and a boot program are stored, and the reference numeral 3 denotes a RAM which is used as a working area. The reference numeral 4 denotes a storage device such as a hard disk drive, in which an OS, a control program for the encoding and the conversion in the first embodiment, and each stream, are stored. The reference numeral 5 denotes a video image input unit which sequentially reads the film material used in the movie.

Any video image input unit to which the video image having 24 frames per second is input may be used as the video image input unit 5. For example, the image pickup apparatus which takes the video image at the rate of 24 frames per second or the film scanner which sequentially reads the film of the movie material having 24 frames per second may be used as the video image input unit 5. When the data which becomes the material exists on the network, it is also possible that the video signal input terminal 101 is regarded as the network interface.

The reference numeral 6 denotes a conversion unit, and the reference numeral 7 denotes an encoding unit. Recently, in a PC, since performance is remarkably improved, it is possible that the processes corresponding to the conversion unit 6 and the encoding unit 7 are realized by a software process. The reference numeral 8 denotes an output unit which outputs the stream. When the output destination of the output unit 8 exists on the network (for example, file server), the output unit is the network interface.

In the configuration described above, the power of the apparatus is turned on, the OS is loaded in the RAM 3, and an application in the first embodiment is loaded in the RAM 3. Therefore, the above-described processes according to FIG. 1 are performed, and the video signal is stored in an external storage device 4 (corresponding to the recording medium 105 in FIG. 1). In FIG. 1, the video signal having 24 frames per second of the film material is input from the video signal input terminal 101. However, it is also possible that the video signal having 24 frames per second of the film material is stored in the external storage device 4.

Second Embodiment

Then, a second embodiment will be described. In the second embodiment, the image processing apparatus has the same configuration as for the first embodiment shown in FIG. 1.

In MPEG, one GOP is constructed by the I picture of one frame and predetermined numbers of P frames and B frames, and the encoding process is performed in unit of GOP. At this point, a variable M indicating the number of frames from the I picture to the P picture or the number of frames between the P pictures is used as a variable expressing the structure of GOP. In the first embodiment, the distance between the I picture and the P picture and the distance between the P pictures are set at five frames, so that M=5. This is because the copy frame inserted when converting the four frames into five frames is securely encoded as the B picture.

However, in the case of the GOP configurations except for M=5, the first embodiment cannot support the GOP configurations. Therefore, in the second embodiment, the cases except for M=5, or the like, the case of M=3 which is often used will be described.

Figure 3:
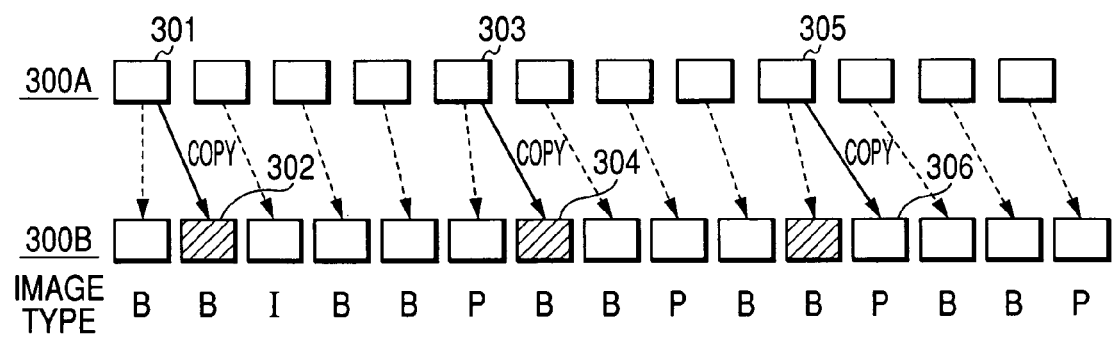
FIG. 3 is a view for explaining a process performed by the conversion unit in a second embodiment.

FIG. 3 shows an example of the conversion process performed by the conversion unit 102 in the second embodiment.

In FIG. 3, the reference numeral 300A denotes the input moving image data having 24 frames per second, and the reference numeral 300B denotes the moving image data having 30 frames per second which is obtained by converting the moving image data 300A having 24 frames per second.

A copy frame 302 of a frame 301 is inserted after the frame 301, a copy frame 304 of a frame 303 is inserted after the frame 303, and a copy frame 306 of a frame 305 is inserted after the frame 305. Therefore, the input data having four frames are converted into the data having five frames. The control unit 108 gives the direction of the timing in which the copy frames 302, 304, and 306 are inserted.

The conversion unit 102 supplies the converted video signal to the encoding unit 103. The encoding unit 103 compresses the video signal by the MPEG encoding process to generate the stream, and then the encoding unit 103 supplies the stream to the recording and reproducing unit 104.

The control unit 108 gives the direction that either the copy frame generated by the conversion unit 102 or the immediately preceding frame of the copy frame, namely the original frame is encoded as the B picture.

For example, the control unit 108 gives the direction that the copy frames 302 and 304 in FIG. 3 and the immediately preceding frame 305 of the copy frame 306 are encoded as the B picture.

That is, the frame which can be removed as a redundant frame may be not only the copy frame itself but also the original image of the copy frame, so that either the copy frame or the original image may preferably be specified as the B picture according to the GOP structure.

The stream generated by the encoding unit 103 is stored in the recording medium 105 through the recording and reproducing unit 104. The recorded stream is read through the recording and reproducing unit 104, and the stream is supplied to the output unit 106. According to the direction from the control unit 108, the output unit 106 converts the stream having 30 frames per second into the stream having 24 frames per second to output the stream having 24 frames per second to the output terminal 107.

When the control unit 108 directs the output unit 106 to convert the stream having 30 frames per second into the stream having 24 frames per second, the output unit 106 removes the data of the copy frame or the data of the immediately preceding frame of the copy frame from an encoding data string having 30 frames per second, which is supplied from the recording and reproducing unit 104. Then, the output unit 106 converts the stream having 30 frames per second into the stream having 24 frames per second by updating the parameters such as the time stamp so that the parameters are compatible with the stream having 24 frames per second.

Thus, in addition to the inserted copy frame, even if the MPEG encoding of the stream converted into the stream having 30 frames per second is performed using the GOP structure of M=3, the frame which is deleted during the conversion into the stream having 24 frames per second can be encoded as the B picture by adding the immediately preceding frame of the copy frame to the removable frame.

Third Embodiment

Then, a third embodiment will be described. In the third embodiment, the image processing apparatus has the same configuration as for the first embodiment shown in FIG. 1.

In the first embodiment, the redundant frame which can be removed during the conversion of the stream having 30 frames per second into the stream having 24 frames per second is set at the B picture. In the third embodiment, the configuration in which the P picture is removed will be described.

Figure 4:
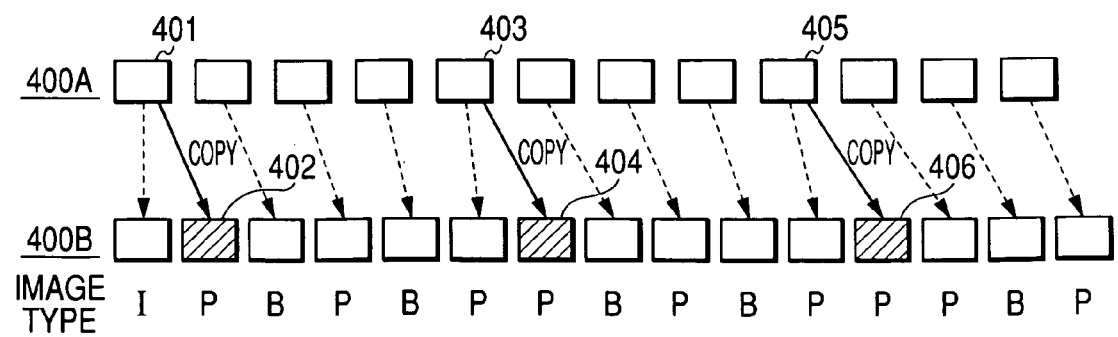
FIG. 4 is a view for explaining a process performed by the conversion unit in a third embodiment.

FIG. 4 shows an example of the converting process performed by the conversion unit 102. A copy frame 402 of a frame 401 is inserted after the frame 401, a copy frame 404 of a frame 403 is inserted after the frame 403, and a copy frame 406 of a frame 405 is inserted after the frame 405. Therefore, the input data 400A having four frames are converted into the data 400B having five frames. The control unit 108 gives the direction of the timing at which the copy frames are inserted.

The conversion unit 102 supplies the converted video signal to the encoding unit 103. The encoding unit 103 compresses the video signal through the MPEG encoding process to generate the stream, and then the encoding unit 103 supplies the stream to the recording and reproducing unit 104.

The control unit 108 gives the direction that the copy frame generated by the conversion unit 102 is encoded as the P picture and the immediately preceding frame of the copy frame, namely the original frame, is encoded as the I picture or the P picture.

For example, the control unit 108 gives the direction that the copy frames 402, 404, and 406 in FIG. 4 are encoded as the P picture and the immediately preceding frames 401, 403, and 405 of the copy frames are encoded as the I picture or the P picture.

That is, even if the copy frame (P picture) is removed as the redundant frame, the immediately preceding frame (I picture or P picture) of the copy frame can be set at the reference frame instead of the copy frame by continuously arranging the image types (I picture or P picture) which become the reference frame to other frames.

The stream generated by the encoding unit 103 is stored in the recording medium 105 through the recording and reproducing unit 104. The recorded stream is read through the recording and reproducing unit 104, and the stream is supplied to the output unit 106. When the control unit 108 directs the output unit 106 to convert the stream having 30 frames per second into the stream having 24 frames per second, the output unit 106 converts the stream having 30 frames per second into the stream having 24 frames per second to output the stream having 24 frames per second to the output terminal 107.

The output unit 106 removes the data of the copy frame from the stream having 30 frames per second, and the output unit 106 updates the parameters such as the time stamp so that the parameters are compatible with the stream having 24 frames per second. Therefore, the output unit 106 converts the stream having 30 frames per second into the stream having 24 frames per second.

Thus, the invention is also applied to the configuration in which the copy frame removable later is encoded as the P picture.

Another Embodiment

As described above, the function realizing means in the first to third embodiments is not limited to the image pickup apparatus having the video image input means, but it is apparent that the function realizing means can be realized with the general purpose information processing apparatus such as the personal computer. That is, the invention covers the utility application program for the computer. Usually, the computer program is stored in the storage medium such as a CD-ROM which can be read by the computer, and the computer program can be executed by setting the computer program in the computer to copy or install the computer program in the system. Therefore, it is clear that the invention also covers the storage medium which can be read by the computer.

Further, the invention includes the case in which, after the supplied program code is stored in the memory included in an extension board of the computer or in an extension unit connected to the computer, the CPU or the like included in the extension board or the extension unit performs a part of or all the actual processes based on the direction of the program code, and the functions of the embodiments are realized by the processes.

Many widely different embodiments of the present invention may be constructed without departing from the spirit and scope of the present invention. It should be understood that the present invention is not limited to the specific embodiments described in the specification, except as defined in the appended claims.

This application claims priority from Japanese Patent Application No. 2004-163559 filed on Jun. 1, 2004, which is hereby incorporated by reference herein.

What is claimed is:

1. A signal processing apparatus comprising:
   a conversion unit which converts first moving image data having a first frame rate into second moving image data having a second frame rate by inserting, as a new frame, an image same as that of a frame to be immediately preceding to the new frame into the first moving image data having the first frame rate;
   an encoding unit which encodes the second moving image data having the second frame rate, output from said conversion unit, by selectively using intra-frame encoding, inter-frame prediction encoding of a first frame type which is not referred back to from another frame, and inter-frame prediction encoding of a second frame type which is referred back to from another frame, wherein said encoding unit selects one of the intra-frame encoding and the inter-frame prediction encoding of the second frame type at an interval of a predetermined number of frames;
   a control unit which controls said encoding unit so as to encode the frame immediately preceding to the frame inserted by said conversion unit, by using the inter-frame prediction encoding of the first frame type in a case where the inserted frame is encoded using the inter-frame prediction encoding of the second frame type;

a recording/reproducing unit which records the moving image data encoded by said encoding unit on a recording medium and reproduces the encoded moving image data from the recording medium; and an output unit which outputs the encoded moving image data of the first frame rate by removing one of the inserted frame and the frame of the first frame type, immediately preceding to the inserted frame, from the moving image data reproduced from the recording medium.

2. An apparatus according to claim 1, wherein said encoding unit performs MPEG encoding, and wherein the first frame type is a B picture of the MPEG encoding and the second frame type is a P picture of the MPEG encoding.

3. An apparatus according to claim 1, wherein said output unit updates time stamp information in the encoded moving image data.

4. An apparatus according to claim 1, wherein said encoding unit adds flag information for identifying the frame to be removed by said output unit, to the encoded moving image data.

5. An apparatus according to claim 1, wherein said control unit controls said encoding unit such that at least one of the frame inserted by said conversion unit and the frame immediately preceding to the inserted frame is encoded by using the inter-frame prediction encoding of the first frame type.

6. A signal processing apparatus comprising:

a conversion unit which converts first moving image data having a first frame rate into second moving image data having a second frame rate by inserting a new frame into the first moving image data having the first frame rate;

an encoding unit which encodes the second moving image data having the second frame rate, output from said conversion unit, by selectively using intra-frame encoding, inter-frame prediction encoding of a first frame type which is not referred back to from another frame, and inter-frame prediction encoding of a second frame type which is referred back to from another frame, wherein said encoding unit selects one of the intra-frame encoding and the inter-frame prediction encoding of the second frame type at an interval of a predetermined number of frames;

a control unit which controls said encoding unit so as to encode the frame immediately preceding to the frame inserted by said conversion unit, by using the inter-frame prediction encoding of the first frame type in a case where the inserted frame is encoded using the inter-frame prediction encoding of the second frame type;

a recording/reproducing unit which records the moving image data encoded by said encoding unit on a recording medium and reproduces the encoded moving image data from the recording medium; and an output unit which outputs the encoded moving image data of the first frame rate by removing one of the inserted frame and the frame of the first frame type, immediately preceding to the inserted frame, from the moving image data reproduced from the recording medium.

7. A signal processing apparatus comprising:

an input unit which inputs second moving image data having a second frame rate;

an encoding unit which encodes the second moving image data having the second frame rate, output from said input unit, by selectively using intra-frame encoding, inter-frame prediction encoding of a first type which is not referred back to from another frame, and inter-frame prediction encoding of a second type which is referred back to from another frame;

a recording and reproducing unit which records the encoded second moving image data encoded by said encoding unit on a recording medium and reproduces the encoded second moving image data from the recording medium; and a conversion unit which generates encoded first moving image data having a first frame rate different from the second frame rate by performing a process comprising removing a frame from the second encoded moving image data reproduced from the recording medium, wherein the encoding unit encodes the frame to be removed by the conversion unit by using the inter-frame prediction encoding of the first type, and encodes the frame not to be removed by the conversion unit by using a selected one of the intra-frame encoding and the inter-frame prediction encoding of the second type.

8. An apparatus according to claim 7, wherein said encoding unit performs MPEG encoding, and wherein the first type is a B picture of the MPEG encoding and the second type is a P picture of the MPEG encoding.

9. An apparatus according to claim 7, wherein said conversion unit updates time stamp information in the first encoded moving image data.

10. An apparatus according to claim 7, wherein said conversion unit removes a predetermined frame from the second encoded moving image data.

\* \* \* \* \*